(12) United States Patent
Hoffman et al.

(10) Patent No.: US 8,232,364 B2
(45) Date of Patent: Jul. 31, 2012

(54) GEL MASSES BASED ON POLYURETHANE, THEIR PRODUCTION AND USE

(75) Inventors: Andreas Hoffman, Cologne (DE); Heinz-Dieter Ebert, Burscheid (DE); Matteo Mason, Limena (IT)

(73) Assignee: TechnoGel GmbH, Berlingerode (DE)

( * ) Notice: Subject to any disclaimer, the term of this patent is extended or adjusted under 35 U.S.C. 154(b) by 362 days.

(21) Appl. No.: 11/517,237

(22) Filed: Sep. 7, 2006

(65) Prior Publication Data

US 2007/0066788 A1    Mar. 22, 2007

(30) Foreign Application Priority Data

Sep. 16, 2005 (DE) .......................... 10 2005 044 314

(51) Int. Cl.
*C08G 18/10* (2006.01)

(52) U.S. Cl. ................ 528/59; 528/60; 528/77; 528/81; 521/159; 521/171; 521/172; 252/182.21; 252/182.26; 560/25; 560/26; 560/158; 560/160

(58) Field of Classification Search .................... 528/58, 528/76, 59, 60, 77, 81; 521/159, 172, 171; 252/182.26, 182.21; 560/25, 29, 158, 160
See application file for complete search history.

(56) References Cited

U.S. PATENT DOCUMENTS

| 3,644,457 | A | * | 2/1972 | Konig et al. ................... 560/351 |
| 4,456,642 | A | * | 6/1984 | Burgdorfer et al. ............. 428/68 |
| 4,914,173 | A | | 4/1990 | Ansell .............................. 528/49 |
| 5,017,625 | A | * | 5/1991 | Ansell ........................... 521/159 |
| 5,183,664 | A | | 2/1993 | Ansell ........................... 424/445 |
| 5,362,834 | A | * | 11/1994 | Schapel et al. .................. 528/58 |
| 6,136,879 | A | * | 10/2000 | Nishida et al. ................ 521/174 |
| 6,809,143 | B2 | * | 10/2004 | Nowak et al. ................ 524/493 |
| 2004/0147707 | A1 | * | 7/2004 | Arendoski ....................... 528/58 |

FOREIGN PATENT DOCUMENTS

WO    WO-88/01878    *  9/1988

* cited by examiner

*Primary Examiner* — Ling Choi
*Assistant Examiner* — Michael L Leonard
(74) *Attorney, Agent, or Firm* — Whitham, Curtis, Christofferson & Cook, PC

(57) ABSTRACT

The present invention relates to improved gel masses prepared from a reaction mixture of NCO prepolymers and selected compounds containing groups reactive towards isocyanate groups. This invention is also directed to a process for the production of these gel masses and to the production of pressure-distributing elements comprising these gel masses.

8 Claims, No Drawings

GEL MASSES BASED ON POLYURETHANE, THEIR PRODUCTION AND USE

CROSS REFERENCE TO RELATED PATENT APPLICATION

The present patent application claims the right of priority under 35 U.S.C. §119 (a)-(d) of German Patent Application No. 10 2005 044 314.1, filed Sep. 16, 2005.

BACKGROUND OF THE INVENTION

The present invention relates to improved gel masses based on a reaction mixture of NCO prepolymers and selected compounds which contain groups reactive towards isocyanate groups, to a process for the production of these gel masses, and to the production of pressure-distributing elements or supports comprising these gel masses.

Gel masses may be used as pressure-distributing elements such as, for example, in cushions for wheelchairs, are principally described as being based on polyvinyl chloride, polyorganosiloxanes and polyurethanes, i.e. reaction products of polyols and polyisocyanates. Gel masses based on polyurethanes, such as those described for example in EP-A 057 838, have proved particularly advantageous for specifically adapting the properties of the gel mass to the particular intended end-use. Such polyurethane gel masses, which can be obtained from polyols of high molecular weight (i.e. hydroxyl numbers of 20 to 112) and polyisocyanates, have the disadvantage that the two reaction components have to be mixed in very different amounts. Therefore, in the mechanical production of these gel masses, the polyisocyanate component, which has to be used in comparatively small amounts, must be proportioned very accurately and with minimal fluctuations; otherwise, inhomogeneous gel masses with different consistencies are obtained.

By contrast, EP-A 511 570 describes polyurethane gel masses in which the components are used at a mixing ratio that allows a homogeneous blending of the components, especially when high-pressure machines are employed. The polyol component required consists of a mixture of polyols with hydroxyl numbers below 112, and polyols with hydroxyl numbers ranging from 112 to 600. The isocyanate index of the reaction mixture ranges from 15 to 59.81, and the product of isocyanate functionality and polyol functionality is at least 6.15. One disadvantage of these gel masses is that the mechanical properties can only be varied within narrow limits. Thus, for a low hardness such as, for example, a Shore 00<40, only a very limited recovery capacity can be achieved. Recovery capacity is understood by those of ordinary skill in the art as meaning the time taken by a shaped gel body to return to its initial height after a vertical compression of 50%. The very limited recovery capacity of these gel masses greatly restricts the possible fields of end-use.

EP-A 282 554 describes skin-friendly gel masses with inherent stickiness which can be used, for example, in skin plasters. The gel masses are obtained by reacting NCO prepolymers (prepared by reacting a polyisocyanate with a polyoxyalkylenediol monoalkyl ether) and a hydroxyl-containing compound such as, for example, water or a polyol. The polyols used can be, inter alia, are diols which are reacted in stoichiometric amounts with the NCO prepolymer. One disadvantage of these gel masses is that the mechanical properties can only be varied within narrow limits. Thus, if an attempt is made to obtain a low hardness such as, for example, a Shore 00<40, by reducing the isocyanate index, the resulting gel masses have a low recovery capacity or even dimensional instability.

Therefore, an object of the present invention was to provide gel masses which have low hardnesses, a good recovery capacity, and whose mechanical properties can be varied within wide limits. At the same time, it should be possible to blend the components which form the gel mass homogeneously when employing high-pressure machines, since this is the only way in which rapid, reactive gel systems can be processed.

Surprisingly, improved gel masses have been found which do not exhibit the disadvantages described above and which achieve the object with outstanding results.

SUMMARY OF THE INVENTION

The invention provides gel masses based on a reaction mixture of NCO prepolymers and polyol components in which
a) the NCO prepolymers comprise the reaction product of one or more polyisocyanates having a functionality of 2.1 to 5, with one or more polyoxyalkylenediol monoalkyl ethers having a molecular weight of 1000 to 18,000, in which the ratio of NCO groups to OH groups is between 2:1 and 8:1, and
b) the polyol components have a mean hydroxyl number of 6 to 112 and a functionality of 3 to 8,
in which the isocyanate index of the reaction mixture ranges from 15 to 60.

DETAILED DESCRIPTION OF THE INVENTION

The gel masses of the invention are produced by reacting NCO prepolymers and polyol components. The suitable NCO prepolymers are prepared from the reaction of one or more polyisocyanates having a functionality of 2.1 to 5, with one or more polyoxyalkylenediol monoalkyl ethers having a molecular weight of 1000 to 18,000, in relative amounts such that the ratio of NCO to OH groups in the prepolymer ranges between 2:1 and 8:1. The polyol components suitable as component b) in the present invention include those which have a mean hydroxyl number of 6 to 112 and a functionality of 3 to 8. The isocyanate index of the reaction mixture from which the gel masses are produced ranges from 15 to 60. As used herein, the term Isocyanate Index is understood as meaning the equivalent ratio of NCO groups to OH groups, multiplied by 100. Thus, for example, an isocyanate index of 15 means that there is 0.15 reactive NCO group from the prepolymers to one reactive OH group from the polyols, or that there are 6.67 reactive OH groups from the polyols to one reactive NCO group from the prepolymers.

The components for producing the gel masses of the present invention can be used in a mixing ratio that allows a homogeneous blending of the components, particularly when employing high-pressure machines. The use of high-pressure machines also makes it possible to process rapid, reactive gel systems, and hence, to produce shaped gel bodies economically with short cycle times. Furthermore, the mechanical properties of the gel masses can be varied within wide limits. Thus, for a low hardness (Shore 00<40), it is possible to achieve good recovery capacities, as required, for example, for pressure-distributing supports in antidecubitus cushions, armrests, shoe insoles, office chairs, mattresses and bicycle saddles.

In general, the gel masses of the present invention are preferably anhydrous, and can optionally also contain fillers such as those which are known per se from polyurethane chemistry. These fillers may be present in amounts of from 0 to 50 wt. %, based on the total weight of the gel mass. The gel masses can also optionally contain one or more auxiliary substances and/or additives in amounts of from 0 to 25 wt. %, based on the total weight of the gel mass. Catalysts can also optionally be present in amounts of from 0 to 5 wt. %, based on the total weight of the gel mass.

The present invention also provides a process for the production of gel masses. This process comprises reacting:
a) one or more NCO prepolymers that are prepared from one or more polyisocyanates having a functionality of 2.1 to 5, with one or more polyoxyalkylenediol monoalkyl ethers having a molecular weight of 1000 to 18,000, in which the NCO:OH ratio ranges between 2:1 and 8:1,
with
b) a polyol component comprising one or more polyols having a mean hydroxyl number of 6 to 112 and a functionality of 3 to 8,
in the presence of
c) from 0 to 5 wt. %, based on the total weight of the gel mass, of one or more catalysts for catalysing the reaction between isocyanate groups and hydroxyl groups,
d) from 0 to 50 wt. %, based on the total weight of the gel mass, of one or more fillers,
and
e) from 0 to 25 wt. %, based on the total weight of the gel mass, of one or more auxiliary substances and/or additives, wherein the isocyanate index ranges from 15 to 60.

The suitable polyisocyanates for preparing the starting components a) are preferably aliphatic, cycloaliphatic or aromatic polyisocyanates, and particularly preferably diisocyanates and/or polyisocyanates of the diphenylmethane series that are liquid at room temperature. These include mixtures of 4,4'-diisocyanatodiphenylmethane with 2,4'- and, optionally, 2,2'-diisocyanatodiphenylmethane that are liquid at room temperature, and which have optionally been modified accordingly. Also suitable are polyisocyanate mixtures of the diphenylmethane series which contain not only the 2,2'-, 2,4'- and/or 4,4'-isomers, but also higher homologues thereof, and which are obtainable in a manner known per se by the phosgenation of aniline/formaldehyde condensates, with the mixtures being liquid at room temperature. Modified products of these diisocyanates and polyisocyanates containing urethane groups and/or carbodiimide groups are also suitable. Modified products of these diisocyanates and polyisocyanates containing allophanate groups or biuret groups are also suitable. The polyisocyanate component has a mean NCO functionality of 2.1 to 5.0, and preferably of 2.5 to 3.1.

The polyoxyalkylenediol monoalkyl ethers which are suitable for preparing the starting components a), i.e. the NCO prepolymers, include, for example the poly(oxyalkylene)polyols, which can be prepared in a manner known per se by the polyaddition of alkylene oxides onto monofunctional starter compounds in the presence of catalysts. Preferred starter compounds, which can be either alone or in a mixture, are molecules which contain one hydroxyl group per molecule, such as ethanol, propanol, butanol and butyl diglycol. Monoalkyl ethers containing an alkyl group having 1 to 18 carbon atoms, preferably 2 to 6 carbon atoms and particularly preferably 4 carbon atoms, i.e. monobutyl ethers, are obtained in this way. The poly(oxyalkylene)polyols used according to the invention are preferably prepared from one or more alkylene oxides, with the preferred alkylene oxides being oxirane, methyloxirane and ethyloxirane. These alkylene oxides can be used alone or in a mixture. When used in a mixture, the alkylene oxides can be reacted randomly or in blocks or both in succession. It is preferable to use a mixture of propylene oxide and ethylene oxide to prepare the polyoxyalkylenediol monoalkyl ethers in accordance with the present invention having a number-average molecular weight of 1000 to 18,000 g/mol, and preferably of 1000 to 3000 g/mol. The polyisocyanate prepolymers, i.e. component a) of the invention, are prepared by heating the polyisocyanates and the polyoxyalkylenediol monoalkyl ethers in the indicated NCO/OH ratio (between 2:1 and 8:1), optionally, in the presence of a catalyst, until the reaction has ended.

Apart from its function as a structural component for the polyurethane matrix, the polyol component b) also plays the role of a dispersant. The polyols to be used as component b) in the present invention can preferably be polyhydroxyl-polyethers, polyhydroxyl-polyesters, polyhydroxyl-polythioethers, polyhydoxyl-polyacetals, polyhydroxyl-polycarbonates, polyhydroxyl-polyesteramides, polyhydroxyl-polyamides or polyhydroxyl-polybutadienes, all of which are known per se in polyurethane chemistry, and are liquid at temperatures of from 10 to 60° C. Polyhydroxyl compounds that already containing urethane groups or urea groups, as well as optionally modified natural polyols, such as, for example, castor oil, can also be used as the polyol component. Of course, it is also possible to use mixtures of the aforementioned compounds such as, for example, mixtures of polyhydroxypolyethers and polyhydroxypolyesters.

The polyols, i.e. component b) herein, are preferably polyhydroxypolyethers, which can be prepared in a manner known per se by the polyaddition of alkylene oxides onto polyfunctional starter compounds in the presence of catalysts. The poly(oxyalkylene)polyols used according to the invention are preferably prepared from a starter compound having an average of 3 to 8 active hydrogen atoms with one or more alkylene oxides. Preferred starter compounds are molecules containing three to eight hydroxyl groups per molecule, such as triethanolamine, glycerol, trimethylolpropane, pentaerythritol, sorbitol and sucrose. The starter compounds can be used alone or in a mixture, inter alia with difunctional starter compounds such as, for example, diethylene glycol, dipropylene glycol, triethylene glycol, tripropylene glycol, 1,4-butanediol and 1,6-hexanediol. The polyols b) used according to the invention are prepared from one or more alkylene oxides. The alkylene oxides used are preferably oxirane, methyloxirane and ethyloxirane. These can be used alone or in a mixture. When used in a mixture, the alkylene oxides can be reacted randomly or in a block or both in succession. Also suitable are higher-molecular polyhydroxypolyethers in which high-molecular polyadducts/polycondensates or polymers are present in finely dispersed, dissolved or grafted form. Such modified polyhydroxyl compounds are obtained, for example, when polyaddition reactions (for example, reactions between polyisocyanates and amino-functional compounds) or polycondensation reactions (for example, between formaldehyde and phenols and/or amines) are allowed to proceed in situ in one or more compounds which contain hydroxyl groups (as described in, for example, e.g. in DE-AS 1 168 075 or GB 976 567, the disclosures of which are hereby incorporated by reference). Polyhydroxyl compounds modified by vinyl polymers, such as those obtained, for example, by the polymerization of styrene and acrylonitrile in the presence of polyethers (as described in, for example, U.S. Pat. No. 3,383,351), are also suitable as the polyol component b) in the process of the present invention. Representatives of polyol compounds which are suitable in accordance with the invention as the starting component b) are also described, for example, in Kunststoff-Handbuch, volume VII "Polyurethane", 3rd edition, Carl Hanser Verlag, Munich/Vienna, 1993, pages 57-67 or pages 88-90.

Preferably, the polyol component b) comprises of one or more polyhydroxy-polyethers with a mean hydroxyl number of 6 to 112, and a functionality of 3 to 8, preferably of 3 to 6.

The gel formation reaction, which inherently proceeds slowly, can optionally be accelerated by the addition of catalysts. Suitable catalysts includes those catalysts which are known per se to accelerate the reaction between hydroxyl groups and isocyanate groups. Tertiary amines of the type known per se are particularly suitable, with some examples including compounds such as triethylamine, tributylamine, N-methylmorpholine, N-ethylmorpholine, N-cocomorpholine, N,N,N',N'-tetramethylethylenediamine, 1,4-diazabicyclo[2.2.2]octane, N-methyl-N'-dimethylaminoethylpiperazine, N,N-dimethylcyclohexylamine, N,N,N',N'-tetramethyl-1,3-butanediamine, N,N-dimethylimidazole-β-phenylethylamine, 1,2-dimethylimidazole or 2-methylimidazole. Organic metal catalysts, especially organic bismuth catalysts such as, for example, bismuth(III) neodecanoate, or organic tin catalysts such as, for example, tin(II) salts of carboxylic acids, such as tin(II)acetate, tin(II) octoate, tin(II) ethylhexanoate and tin(II) laurate, and the dialkyltin salts of carboxylic acids, such as dibutyltin diacetate, dibutyltin dilaurate, dibutyltin maleate or dioctyltin diacetate, can also be used, either on alone or in combination with the tertiary amines. It is preferable to use from 0 to 5 wt. %, more preferably from 0.3 to 2.0 wt. %, of a catalyst or a catalyst combination, based on the total weight of the gel mass. Other representatives of catalysts and details of the mode of action of the catalysts are described in Kunststoff-Handbuch, volume VII "Polyurethane", 3rd edition, Carl Hanser Verlag, Munich/Vienna, 1993, pages 104-110.

Fillers which are also optionally used in the present invention can be either inorganic or organic fillers. Examples of inorganic fillers which may be mentioned include silicate minerals, e.g. sheet silicates, metal oxides such as iron oxides, especially pyrogenic metal oxides like Aerosils (as described in U.S. Pat. No. 6,908,143, the disclosure of which is hereby incorporated by reference, and which is believed to correspond to EP-B 1 125 975), metal salts such as barite, inorganic pigments such as cadmium sulfide and zinc sulfide, and glass, glass microspheres, hollow glass microspheres, etc. It is possible to use natural and/or synthetic fibrous minerals such as, for example, wollastonite and glass fibers of different length, which may optionally be sized. Examples of suitable organic fillers which may be mentioned are crystalline paraffins or fats (phase change materials) (as described in U.S. Published Applications 2003088019 and U.S. Published Application 2204234726, the disclosures of which are hereby incorporated by reference, and which are believed to correspond to EP-B 1 277 801) and powders based on polystyrene, polyvinyl chloride, urea/formaldehyde compounds and/or polyhydrazodicarboxamides which are obtained, for example, from hydrazine and toluene diisocyanate. It is possible here, for example, for urea/formaldehyde resins or polyhydrazodicarboxamides to have been prepared directly in a polyol that is to be used for the production of gel masses according to the invention. Hollow microspheres of organic origin (as described in U.S. Pat. No. 4,588,173, the disclosure of which is hereby incorporated by reference, and which is believed to correspond to EP-B 1 142 943) or cork (as described in DE 100 24 087) can also be added. The organic or inorganic fillers can be used individually or as mixtures. If used at all, the fillers are added to the reaction mixture in amounts of 0 to 50 wt. % and preferably of from 0 to 30 wt. %, based on the total weight of the gel mass.

The auxiliary substances and additives which are optionally used concomitantly include, for example, coloring agents, water-binding substances, flameproofing agents, plasticizers and/or monohydric alcohols.

Examples of coloring agents which the gel masses according to the invention can contain are organic and/or inorganic dyestuffs, and/or colored pigments which are known per se for the coloring of polyurethanes such as, for example, iron oxide and/or chromium oxide pigments and phthalocyanine and/or monoazo pigments.

Suitable water-binding substances include both compounds that are highly reactive towards water such as, for example, tris(chloroethyl) orthoformate, and water-binding fillers such as, for example, alkaline earth metal oxides, zeolites, aluminium oxides and silicates. Suitable synthetic zeolites are marketed, for example, under the name Baylith®.

Examples of suitable flameproofing agents which are optionally to be used include, for example, tricresyl phosphate, tris-2-chloroethyl phosphate, tris-chloropropyl phosphate and tris-2,3-dibromopropyl phosphate. Apart from the halogen-substituted phosphates already mentioned, it is also possible to use inorganic flameproofing agents such as aluminium oxide hydrate, ammonium polyphosphate, calcium sulfate, sodium polymetaphosphate or amine phosphates, e.g. melamine phosphates.

Examples of plasticizers which may be mentioned include esters of polybasic carboxylic acids, preferably dibasic carboxylic acids, with monohydric alcohols. The acid component of such esters can be derived, for example, from succinic acid, isophthalic acid, trimellitic acid, phthalic anhydride, tetrahydrophthalic and/or hexahydrophthalic anhydride, endomethylenetetrahydrophthalic anhydride, glutaric anhydride, maleic anhydride, fumaric acid and/or dimeric and/or trimeric fatty acids, optionally, in a mixture with monomeric fatty acids. The alcohol component of such esters can be derived from, for example, branched and/or unbranched aliphatic alcohols having 1 to 20 C (carbon) atoms, such as methanol, ethanol, propanol, isopropanol, n-butanol, sec-butanol, tert-butanol and the various isomers of pentyl alcohol, hexyl alcohol, octyl alcohol (e.g. 2-ethylhexanol), nonyl alcohol, decyl alcohol, lauryl alcohol, myristyl alcohol, cetyl alcohol and stearyl alcohol, and/or from naturally occurring fatty and waxy alcohols, or fatty and waxy alcohols obtainable by the hydrogenation of naturally occurring carboxylic acids. Other suitable alcohol components include cycloaliphatic and/or aromatic hydroxyl compounds such as, for example, cyclohexanol and homologues thereof, phenol, cresol, thymol, carvacrol, benzyl alcohol and/or phenylethanol. Other suitable plasticizers are esters of the aforementioned alcohols with phosphoric acid. Optionally, phosphoric acid esters of halogenated alcohols, e.g. trichloroethyl phosphate, can also be used. In the latter case a flame-inhibiting effect can be achieved simultaneously with the plasticizing effect. Of course, it is also possible to use mixed esters of the aforementioned alcohols and carboxylic acids. The plasticizers can also be so-called polymeric plasticizers, for example, polyesters of adipic, sebacic and/or phthalic acid. Alkylsulfonic acid esters of phenol, e.g. phenyl paraffinsulfonate, can also be used as plasticizers.

Other additives which are optionally used in the present invention are monohydric alcohols such as butanol, 2-ethylhexanol, octanol, dodecanol or cyclohexanol, which can optionally be used concomitantly for the purpose of bringing about a desired chain termination.

If used at all, these additives are incorporated into the reaction mixture in amounts of from 0 to 25 wt. %, preferably from of 0 to 10 wt. %, based on the total weight of the gel mass. Further details of the conventional auxiliary substances and/or additives can be found in the scientific literature, e.g. Kunststoff-Handbuch, volume VII "Polyurethane", 3rd edition, Carl Hanser Verlag, Munich/Vienna, 1993, page 104 et seq.

The gel masses of the present invention are suitable to be used, for example, as pressure-distributing elements or supports. For this purpose, it is generally necessary to provide the gel masses with a partial coating, covering or sheathing on one or all sides of the gel masses. To maximize the pressure-distributing action of the gel masses, it is advantageous to use elastic, stretchable sheathing materials. Elastic sheets are particularly suitable for this purpose, an example being polymer sheets with a good viscoplastic behavior, a high elongation at tear and a high tear strength, such as, for example, polyurethane sheets. Other suitable sheaths are coated, elastic textile fabrics such as woven and knitted fabrics or nonwovens made of natural or synthetic organic or inorganic fibrous materials of elastic character. Flexible sheathings can also be obtained by coating the gel mass with a two-component lacquer that forms a polyurethane. For applications where the specifically adjustable adhesiveness of the gel masses is to be utilized such as, for example, in the case of supports on human or animal body surfaces, only a partial or one-sided coating or covering on the gel mass is required. This is the case particularly for single-use applications.

In principle, gel masses can be produced in a variety of ways including, for example, by the one-shot process or the prepolymer process. In the one-shot process, all of the components, i.e. polyols, polyisocyanates, optionally catalysts and optionally fillers and/or additives, are brought together at the same time and are intimately mixed with one another. In the prepolymer process, the first step is to prepare an isocyanate prepolymer by reacting part of the polyol with all the polyisocyanate intended for gel formation, after which the remaining polyol and optionally catalyst, fillers and/or additives are incorporated into the resulting prepolymer and the ingredients are intimately mixed. The prepolymer process is particularly preferred in terms of the present invention. Here the components b) to e) are mixed to form a "polyol component", which is then processed with the polyisocyanate prepolymer a). The catalysts, fillers, auxiliary substances and additives which are optionally to be used concomitantly are generally added to the "polyol component" b), but this is not absolutely necessary since catalysts, fillers, auxiliary substances and additives which are compatible with the polyisocyanate component a) can also be incorporated into said polyisocyanate component.

The mixture formed by thorough mixing of the reaction components is introduced into the appropriate mould. This involves the feeding, proportioning and mixing of single components or component mixtures using the devices known per se in polyurethane chemistry. The amount of mixture introduced into the mold is generally measured so that the shaped bodies have a density of 1.0 to 1.2 g/cm$^3$. In the particular case of the concomitant use of mineral fillers, the resulting shaped bodies can have a density of more than 1.2 g/cm$^3$. The starting temperature of the mixture introduced into the mold is generally chosen within the range from 20 to 80° C., preferably from 40 to 60° C. The temperature of the mold is generally 20 to 100° C., preferably 40 to 60° C. Depending on the reaction components, added catalysts and temperature profile, the time to completion of the gel formation and demolding of the shaped bodies can be from 1 minute to 12 hours, preferably from 3 to 10 minutes.

The gel masses according to the invention have the property of deforming under pressure, thereby distributing the pressure, i.e. lowering the pressure peaks, and of returning to their initial state after the deforming force has been removed. In particular, they have the characteristics of low hardness and high elasticity, so they can be used in a variety of ways such as, for example, gel cushions in orthopaedic shoes and sports shoes, on bicycle saddles, under riding saddles, on wheelchairs and sick beds, on sitting areas, back areas, headrests and armrests of seating furniture, especially office chairs, in mattresses, car seats or other seats, and on operating tables or medical examination tables. Furthermore, pressure-distributing elements which consist of a gel mass according to the invention with a one-sided covering or coating, and have a high adhesiveness, can be used especially on body surfaces of humans and animals. They are used e.g. as supports on elbows, shins or foot surfaces for avoiding and reducing the effects of injuries, especially in sports, as supports for cosmetic masks, e.g. face masks, as self-adhesive coverings for securing eye or ear dressings, as supports for loose breast tissue, and as cushioning under riding saddles, on prostheses or on nappies in order to prevent pressure sores.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

The following polyols and NCO prepolymers were used in the Examples:

Polyol 1: polyetherpolyol prepared by the propoxylation of 1,2-propylene glycol; having an OH number of 56, and a functionality of 2.

Polyol 2: polyetherpolyol prepared by the propoxylation of glycerol; having an OH number of 56, and a functionality of 3.

Polyol 3: polyetherpolyol prepared by the propoxylation of sorbitol and subsequent ethoxylation of the alkoxylation product; having an OH number of 28.5, and a functionality of 6.

Polyol 4: polyetherpolyol prepared by the propoxylation of sorbitol and subsequent ethoxylation of the alkoxylation product; having an OH number of 100, and a functionality of 6.

NCO Prepolymer 1: prepolymer comprising the reaction product of Desmodur® 44V10 (a polymethylene polyphenylisocyanate commercially available from Bayer MaterialScience AG; having an NCO group content of 31.8%, a mean NCO functionality of 2.8, and a viscosity at 25° C. of 100 mPa·s) with Desmophen® VP.PU 50RE93 (a polyoxyalkylenediol monoalkyl ether commercially available from Bayer MaterialScience AG; having a number-average molecular weight of 1700 g/mol, and a functionality of 1) in an NCO:OH ratio of 4:1 (with the product having a theoretical NCO group content of 5.8%).

NCO Prepolymer 2: prepolymer comprising the reaction product of Desmodur® 44V10 (a polymethylene polyphenylisocyanate commercially available from Bayer MaterialScience AG; having an NCO group content of 31.8%, a mean NCO functionality of 2.8, and a viscosity at 25° C. of 100 mPa·s) with Desmophen® VP.PU 50RE93 (a polyoxy-alkylenediol monoalkyl ether commercially available from Bayer MaterialScience AG; having a number-average molecular weight of 1700 g/mol, and a functionality of 1) in an NCO:OH ratio of 2:1 (with the product having a theoretical NCO group content of 2.2%).

Catalyst 1: bismuth(III) neodecanoate (commercially available as Coscat® 83, C. H. Erbslöh, 47809 Krefeld).

Procedure:

To prepare the polyisocyanate prepolymer, Desmodur® 44V10 and Desmophen® VP.PU 50RE93 were mixed in the given NCO:OH ratio, and the mixture was reacted for four hours at 80° C., then cooled to room temperature.

The gel mass was produced by first homogenizing 100 parts by weight of polyol and 1 part of catalyst 1. Then, x parts by weight of NCO prepolymer were added (see Table 1 for mixing ratio), and the ingredients were mixed for one minute. Solidification of the mixture to form the gel started approx. one minute after the addition of the NCO prepolymer. This resulted in a flexible gel mass whose dimensional stability, recovery capacity and Shore 00 hardness were determined.

TABLE 1

|  | Example | | | | | | |
|---|---|---|---|---|---|---|---|
|  | 1* | 2* | 3* | 4 | 5 | 6 | 7 |
| Polyol | 1 | 1 | 2 | 2 | 2 | 3 | 4 |
| OH number | 56 | 56 | 56 | 56 | 56 | 28 | 100 |
| Functionality | 2 | 2 | 3 | 3 | 3 | 6 | 6 |
| Index | 100 | 60 | 100 | 60 | 49 | 60 | 18 |
| Parts by weight of NCO prepolymer | 81 | 49 | 81 | 48 | 40 | 39 | 26 |
| NCO prepolymer | 1 | 1 | 1 | 1 | 1 | 2 | 1 |
| Dimensional stability | yes | no | yes | yes | yes | yes | yes |
| Recovery capacity [sec] | 1 | — | 1 | 1 | 2 | 1 | 3 |
| Shore 00 hardness | 50 | — (liquid) | 83 | 39 | 6 | 33 | 1 |

*comparison

Comparative Examples 1 and 2 illustrate that a dimensionally unstable gel mass is obtained when an attempt is made to obtain a low gel hardness (Shore 00<40) by reducing the isocyanate index.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A gel mass comprising a reaction product obtained from a reaction mixture comprising one or more NCO prepolymers and one or more polyols, wherein
   a) said one or more NCO prepolymers comprise the reaction products of one or more polyisocyanates having a functionality of 2.1 to 5, with one or more polyoxyalkylenediol monoalkyl ethers having a molecular weight of 1000 to 18,000, wherein the ratio of NCO groups to OH groups is between 2:1 and 8.1, and
   b) said one or more polyols have a mean hydroxyl number of from 6 to 112 and a functionality of from 3 to 8, and wherein the isocyanate index of said reaction mixture is in the range of from 15 to 60, and wherein said gel mass has a property of deforming from an initial state under pressure of a deforming force, and of returning to said initial state after said deforming force is removed.

2. The gel mass of claim 1, wherein the reaction mixture further comprises one or more fillers in an amount of 0 to 50 wt. %, based on the weight of the gel mass.

3. The gel mass of claim 1, wherein the reaction mixture further comprises one or more catalysts in an amount of 0 to 5 wt. %, based on the weight of the gel mass.

4. The gel mass of claim 1, wherein the reaction mixture further comprises one or more auxiliary substances and additives in an amount of 0 to 25 wt. %, based on the weight of the gel mass.

5. A process for the production of a gel mass comprising the steps of:
   reacting in a homogenously blended reaction mixture that comprises:
   a) one or more NCO prepolymers which comprise the reaction product of one or more polyisocyanates having a functionality of from 2.1 to 5, with one or more polyoxyalkenediol monoalkyl ethers having a molecular weight of from 1000 to 18,000, at an NCO:OH ratio of between 2:1 and 8:1, and
   b) one or more polyols having a mean hydroxyl number of from 6 to 112 and a functionality of from 3 to 8,
   in the presence of
   c) from 0 to 5 wt. %, based on the weight of the gel mass, of one or more catalysts suitable for catalyzing a reaction between isocyanate groups and hydroxyl groups,
   d) from 0 to 50 wt. %, based on the weight of the gel mass, of one or more fillers, and
   e) from 0 to 25 wt. %, based on the weight of the gel mass, of one or more auxiliary substances and/or additives,
   wherein the isocyanate index is in the range of from 15 to 60; and
   recovering, a gel mass from said reacting step which has a property of deforming from an initial state under pressure of a deforming force, and of returning to said initial state after said deforming force is removed.

6. A pressure distributing support or element which includes a gel mass comprising a reaction product obtained from a reaction mixture comprising one or more NCO prepolymers and one or more polyols, wherein
   a) said one or more NCO prepolymers comprise the reaction products of one or more polyisocyanates having a functionality of 2.1 to 5, with one or more polyoxyalkylenediol monoalkyl ethers having a molecular weight of 1000 to 18,000, wherein the ratio of NCO groups to OH groups is between 2:1 and 8.1, and
   b) said one or more polyols have a mean hydroxyl number of from 6 to 112 and a functionality of from 3 to 8,
   and wherein the isocyanate index of said reaction mixture is in the range of from 15 to 60, wherein said gel mass is at least partially covered or coated on one side of said pressure-distributing support.

7. The gel mass of claim 1, wherein said one or more polyols is selected from the group consisting of polyhydroxyl-polyethers, polyhydroxyl-polyesters, polyhydroxyl-polythioethers, polyhydroxyl-polyacetals, polyhydroxyl-polycarbonates, polyhydroxyl-polyesteramides, polyhydroxyl-polyamides, polyhydroxyl-polybutadienes, and mixtures thereof.

8. The pressure-distributing support which includes a gel mass of claim 6, wherein said pressure-distributing support is configured as at least a portion of a cushion, an arm rest, a show insole, a chair, a mattress or a bicycle saddle.

* * * * *